United States Patent

[11] 3,581,797

| [72] | Inventor | Walter F. Kinnucan |
| | | 6729 S. Crandon Ave., Chicago, Ill. 60649 |
| [21] | Appl. No. | 832,079 |
| [22] | Filed | June 11, 1969 |
| [45] | Patented | June 1, 1971 |

[54] TRACTION UNIT AND ASSEMBLIES FOR USE WITH DUAL TIRE WHEEL ARRANGEMENT
12 Claims, 7 Drawing Figs.

[52] U.S. Cl. .................................................. 152/220
[51] Int. Cl. .................................................. B60c 27/22
[50] Field of Search .................................... 152/220

[56] References Cited
FOREIGN PATENTS
611,668  10/1926  France ........................ 152/220
468,888  10/1950  Canada ....................... 152/220

*Primary Examiner*—James B. Marbert
*Attorney*—James J. Jennings, Jr.

ABSTRACT: A traction unit for a dual tire wheel arrangement includes a rocker arm positioned in the well between the dual tires, and a pair of traction plates, each affixed to one end of the rocker arm and each having a pair of wing portions extending outwardly over the tire treads. In one assembly the units are positioned in place on the tires without any joinder to the dual tire arrangement, by a plurality of connecting units between adjacent traction units, such as chain links, T-bolt assemblies, and/or turnbuckles. In another assembly a single traction unit is affixed through a hole in the spacer between the tire rims, by an arrangement comprising a pair of chains extending from the ends of the rocker arm downwardly to an eyebolt extending through the spacer unit.

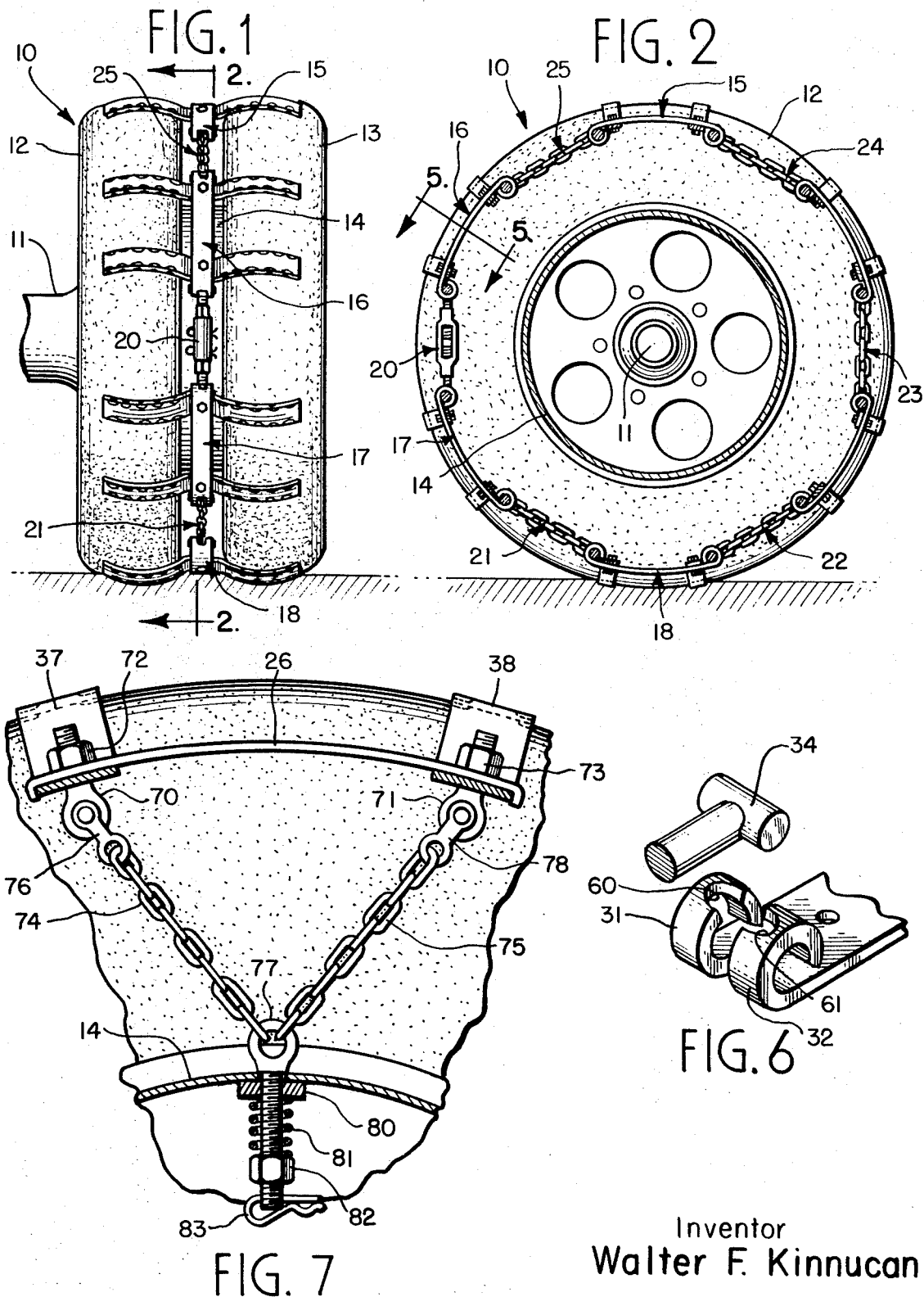

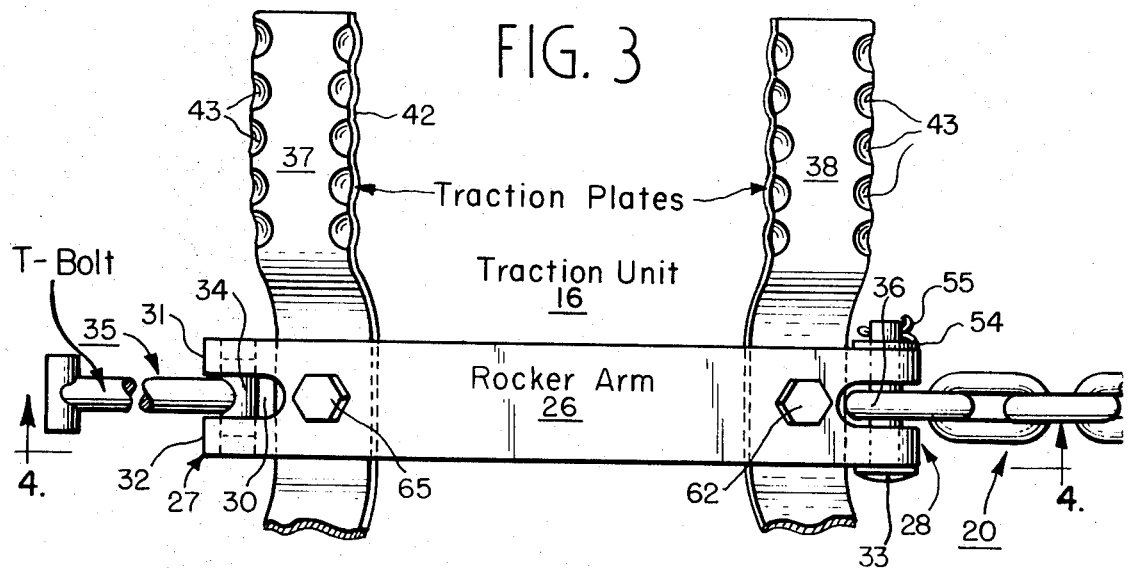
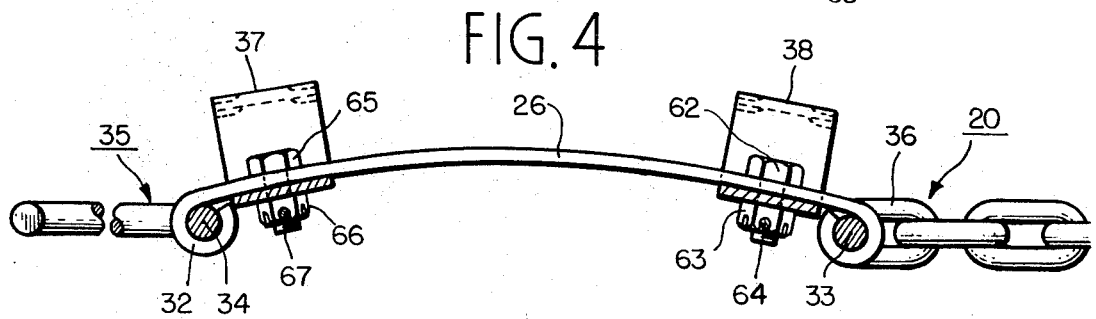
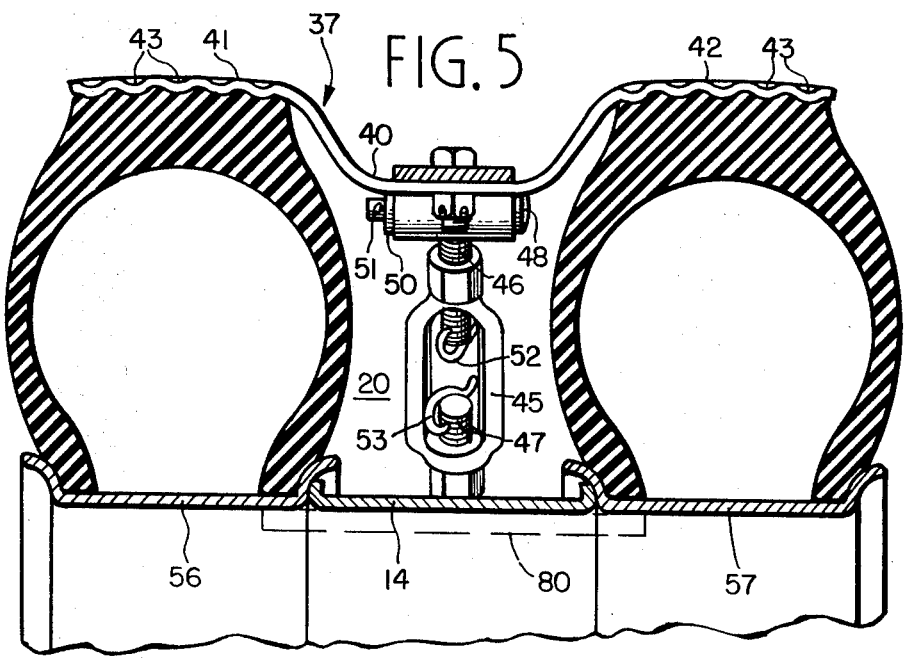
Inventor
Walter F. Kinnucan
By James V. Jennings, Jr.
Attorney

TRACTION UNIT AND ASSEMBLIES FOR USE WITH DUAL TIRE WHEEL ARRANGEMENT

BACKGROUND OF THE INVENTION

The present invention is a structure for increasing the traction obtainable by large trucks with dual tire wheel arrangements. Such large trucks, which include not only those units having the body mounted integrally with the cab, but also tractors by themselves, trailers and semitrailers, generally have a dual tire wheel arrangement in which a spacer unit extends between the rims of the two adjacent wheels in the assembly to maintain the appropriate alignment during operation. The problems of increasing the frictional engagement between the wheel and the road surface grow more complex as the weight and size of the vehicles increases, which has lead to the use of airbrakes and other more costly safety arrangements on large trucks to enhance the control and increase the safety of operating such units. Considerable attention has been directed toward providing some unit which can be attached to the wheel assemblies in bad weather conditions, such as rain, sleet, or snow, to increase the traction and correspondingly minimize the loss of control and danger which are normally associated with such weather conditions. Because of human nature it is difficult to encourage the drivers to stop the vehicle, especially when the weather suddenly changes for the worse, and apply the conventional skid chains or other traction-enhancing arrangement to the wheels. This has been especially true because most prior art arrangements have necessitated the jacking up of the wheel assembly to install, even temporarily, the friction increasing means.

A significant step forward in this art is disclosed and claimed in U.S. Pat. No. 2,858,871, entitled "Traction Device," which was issued to W. F. Kinnucan on Nov. 4, 1958. This patent teaches the provision of a series of anchors or bosses around the spacer between the tire rims, such that a traction device with a plurality of calks or similar protrusions can readily be affixed to the anchors on the spacer. This salient advance in the art greatly simplifies the work required and time expended in affixing the traction units to the wheel assembly, but still necessitates the provision of the anchors on the spacer unit. In addition each of the calks or spikes was required to be individually mounted on the traction device extending over the tire tread, and this increases the time and expense of manufacturing the complete assembly.

It is therefore a primary object of the present invention to provide an improved traction unit which does not require any modification of the spacer unit, and which obviates installation of individual calks or spikes on the traction unit.

Another important object of the invention is to provide a complete traction assembly, including a plurality of traction units, which can be simply and quickly installed around the wheel perimeter without the necessity of anchoring to any portion of the spacer or other part of the conventional wheel assembly.

SUMMARY OF THE INVENTION

A traction unit constructed in accordance with the inventive teaching for use with a dual tire wheel arrangement includes a rocker arm, which has an arcuate central portion curved in substantially the same curvature as the outer periphery of a tire. The rocker arm has a pair of end portions, each of which defines a central channel between a pair of tongues bent into substantially circular configuration. A pair of traction plates are provided for each unit, with each plate having a generally U-shaped central portion and a pair of wing portions, such that each wing portion extends outwardly to overlay the tire tread as the U-shaped central portion is received in the well between adjacent tire walls. Fastening means, such as nut-and-bolt assemblies, are provided to affix the central portion of each traction plate to an end portion of each rocker arm, thus completing the traction unit.

In accordance with an important aspect of the invention, a plurality of such traction units are combined into a traction assembly by providing chain links or other connectors between adjacent traction units. At least one tension-adjusting means, such as a turnbuckle, is provided in the entire assembly to facilitate adjustment after the traction assembly is inserted in place.

In accordance with another important aspect of the invention, a single traction unit can be affixed rapidly through a connector which extends through a hole provided in the spacer between the adjacent tire rims. In this arrangement a pair of chains are provided, each chain extending from one end of the rocker arm downwardly to an eyebolt passing through the hole in the rim spacer. The eyebolt shank is retained by a spring and nut arrangement beneath the rim spacer.

THE DRAWINGS

In the several figures of the drawings like reference numerals identify like elements, and in the drawings:

FIG. 1 is a front view, and FIG. 2 is a sectional view taken along the line 2-2 of FIG. 1, depicting a dual tire wheel arrangement with a plurality of traction units affixed to complete a traction assembly;

FIG. 3 is a top view, and FIG. 4 is a sectional showing along the line 4-4 of FIG. 3, taken on a scale enlarged with respect to that of FIGS. 1 and 2, depicting an individual traction unit with a portion of the coupling units attached to either end;

FIG. 5 is a sectional view, taken on the line 5-5 of FIG. 2 and on a scale enlarged relative to the scale of FIG. 2, showing a traction unit in the mounted position with one tension-adjusting arrangement;

FIG. 6 is a perspective view illustrating an alternate form of connection between adjacent traction units; and FIG. 7 is a side view, partly in section, illustrating an alternate arrangement for affixing a single traction unit to the dual tire wheel arrangement.

THE PRESENT INVENTION

Traction Assembly

FIG. 1 shows a dual tire wheel arrangement 10 mounted at the end of an axle 11. The arrangement 10 includes an inner tire 12 and an outer tire 13, maintained in position and alignment by conventional means including a spacer unit 14 which is positioned between the tire rims in a manner which will be explained more fully hereinafter in connection with FIG. 5.

FIG. 1 also depicts a plurality of traction units 15, 16, 17 and 18 constructed in accordance with this invention and intercoupled by a plurality of coupling units to provide one complete traction assembly. As used in this description and in the appended claims, "dual tire wheel arrangement" refers to a conventional arrangement including the adjacent tires 12, 13 and the spacer unit 14; "traction unit" refers to a single one of the combinations referenced by 15, 16, 17 and 18 in FIG. 1, and shown in more detail in FIGS. 3 and 4; and "traction assembly" refers to either a plurality of traction units intercoupled around the dual tire wheel arrangement as shown in FIG. 1, or a single traction unit mounted through a suitable aperture in the spacer unit as will be explained hereinafter in connection with FIG. 7.

FIGS. 1 and 2 show that a complete traction assembly includes a plurality of coupling units 20—25. In the illustrated embodiment coupling unit 20 includes a turnbuckle, thus affording a tension adjustment when the complete traction assembly is installed on the dual wheel arrangement. Each of the other coupling units in the illustrated embodiment comprises a short length of chain with individual links. Thus the term "coupling unit" refers to the means which actually intercouples a pair of adjacent traction units, even through the individual coupling unit may include a plurality of discrete components.

Individual Traction Unit

FIGS. 3 and 4 illustrate a single traction unit 16 of the plurality of units shown generally in FIGS. 1 and 2. The single traction unit includes a central rocker arm 26 which has a pair of end portions 27 and 28. Each end portion of the rocker arm defines a central channel 30 between a pair of tongues 31 and 32, which are bent into a substantially circular configuration. The "substantially circular" arrangement does not require the tongues 31, 32 to form an almost closed loop, as shown in FIGS. 3 and 4, but the tongues need only be bent through more than a semicircle or more than 180°, and need not have a radial curvature. This facilitates the retention of fasteners passed through both tongues, such as clevis pin 33 shown at the right side of FIGS. 3 and 4, or the head portion 34 of a T-bolt connector 35 as depicted at the left portion of FIGS. 3 and 4. The T-bolt connector 35 need not have another T-bolt head on its opposite end, which end could be similarly received in the adjacent traction unit; the T-bolt-type head can also be used to install the turnbuckle or other tension-adjusting arrangement. Alternatively the threaded shaft portions of the turnbuckle can terminate in an eyebolt, for fastening to the traction unit in the same manner as end link 36 of the coupling unit 20 shown at the right side of FIGS. 3 and 4. A washer 54, and a cotter pin or roll pin 55, complete the fastening of the clevis pin in a well-known manner.

Traction unit 16 also comprises a pair of traction plates 37 and 38. As better shown in FIG. 5, each traction plate has a generally U-shaped central portion 40, and a pair of wing portions 41, 42 extending outwardly from the central portion 40 to overlay the tire treads. The traction plates are formed of tempered alloy steel. The outer wing portions 41, 42 are curved slightly to correspond with the curvature of the tire tread. In accordance with an important aspect of this invention, a stamping press is utilized to provide a series of semicircular indentations 43 along each edge portion of the traction plates 37. 38. These corrugations are made much the same way a person uses the end of his thumb or finger to work clay or putty, not only causing the finger-shaped depression but also pushing the material downwardly into corresponding arcuate protrusions on the underside of the traction plates. As shown in FIG. 5 this provides a firm cushioning of the traction plates into the tread rubber areas. At the same time the depressions on the road surface engaging portions of the traction plates enhance the traction of the complete unit.

FIG. 5 also shows the manner in which the turnbuckle 20 affords ready adjustment of the tension level of a complete traction assembly. The turnbuckle includes a central turnbuckle body 45, and a pair of eyebolt and shank units 46 and 47. The eyebolt at the end of unit 46 is not visible but is received in the central channel 30 at the end of rocker arm 26. A clevis pin 48 passes through the curled-over tongues and a washer 50 and cotter pin 51 retain the clevis pin in place. At the other end of the shank 46 a spring clip 52 is inserted to prevent unwanted displacement of the turnbuckle unit after the tension is adjusted. A similar spring clip 53 restrains the other end of shaft 47. FIG. 5 also shows the manner in which a conventional spacer unit 14 is fitted between the rims 56, 57 of the adjacent tires in the dual wheel arrangement.

FIG. 6 depicts the provision of a pair of opposed cutout portions 60 and 61, in the tongues 31 and 32, respectively, to facilitate the insertion of the crosshead 34 of the T-bolt unit as indicated. Note that this arrangement also allows the insertion of a clevis pin or other cylindrical fastener through the bore collectively defined by the tongues 31, 32 and thus this arrangement provides maximum flexibility for utilizing different coupling units with the traction unit.

FIG. 7 depicts another traction assembly in which a single traction unit can be readily affixed to the dual tire wheel arrangement with a spacer unit 14 defining an aperture in a central portion of the spacer. Instead of utilizing a bolt-and-nut arrangement such as 62, 63 shown in FIG. 4, in the embodiment of FIG. 7 each of the fastening means for affixing the traction plates 37, 38 to the rocker arm 26 includes first and second eyebolts 70, 71. The eye portion of each eyebolt is on the side of the rocker arm 26 nearer spacer unit 14. The shank of eyebolt 70 extends upwardly through the aperture in the central portion of traction plate 37 and the aperture in the end of rocker arm 26, and is secured in place by a nut 72. Another nut 73 correspondingly secures the traction plate 38 at the other end portion of rocker arm 26. A pair of chains 74 and 75 are provided. The chain 74 extends from a shackle connector 76 at one end, which provides the connection with eyebolt 70, downwardly to the eye portion of a third eyebolt 77. Chain 75 similarly extends from this eye portion of third eyebolt 77 upwardly to a shackle connector 78, which makes the connection with eyebolt 71.

The shank portion of eyebolt 77 extends downwardly through the aperture in spacer unit 14 and through a corresponding aperture in an anchor plate 80 positioned just below the spacer unit. As shown in broken lines in FIG. 5, the extremities of anchor plate 80 extend outwardly beyond spacer unit 14 to a location just under the outer portion of each of the rims 56 and 57 of the dual tire wheel arrangement. This insures that the weight of the fastening assembly will be borne by the entire dual tire arrangement, and not place undue stress on the spacer unit alone. A spring 81 is positioned axially along the shaft of eyebolt 77, and a nut 82 is in threaded engagement on the shank to retain the spring in the position illustrated. A pin fastener 83 is passed through the end portion of the shank of eyebolt 77 to prevent the nut from working loose. The spring 81 accommodates vertical displacement of the eyebolt assembly as the dimension between the outer tread of the tire and the spacer unit 14 varies from the time when the tire is in contact with the road surface and the remainder of the wheel angular displacement when the tire tread does not contact the road surface.

The novel traction unit of this invention and the traction assemblies which are readily mounted to the wheel have been proven to outwear conventional tire chains by as much as five times. The tempered alloy steel construction provides a structure which is over 10 times stronger than conventional chain units. The illustrated construction fits the conventional dual tires of the sizes 8:25, 9:00, 10:00, 11:00, and 12:00. All tread types are accommodated with this unit.

The traction assembly as shown in FIGS. 1 and 2 can readily be placed on the tire simply by laying the intercoupled traction units along the road surface ahead of the tire and driving over the assembled units. Then one connection is made to complete the assembly, and the turnbuckle 20 is adjusted to insure a firm engagement of the traction plates against the tire treads. In addition to trucks of the types described, the traction units and traction assemblies are useful with fire engines, tow trucks, straight trucks, spotting tractors, snow plows, lift trucks, and construction equipment.

While only particular embodiments of the invention have been described and illustrated, it will be apparent to those skilled in the art that various changes and modifications may be made therein without departing from the invention in its broader aspects. Therefore the aim in the appended claims is to cover all such changes and modifications as may fall within the true spirit and scope of the invention.

What I claim is:

1. For use with a dual tire wheel arrangement, a traction unit comprising
   a rocker arm having an arcuate central portion and a pair of end portions, each end portion defining a central channel between a pair of substantially circular tongues,
   a pair of traction plates, each having a generally U-shaped central portion and a pair of wing portions extending outwardly from the central portion to overlay the tires, and
   means for affixing the central portion of each traction plate to the rocker arm to complete the traction unit.

2. A traction unit as claimed in claim 1 in which the rocker arm defines a pair of bolt holes, one located near the end of each channel, each traction plate defining a corresponding bolt hole in the U-shaped central portion, and the affixing means comprises a pair of bolts, each bolt extending through one of the rocker arm bolt holes and the corresponding bolt hole in one of the traction plates, and a pair of nuts for threaded engagement with the bolts to secure the traction plates to the rocker arm.

3. A traction unit as claimed in claim 1 in which the circular tongues in each end portion of the rocker arm define opposed cutout portions, thus facilitating insertion of a T-bolt head through said cutout portions for retention by said circular tongues, and alternatively affording insertion of a pin fastener through said tongues.

4. A traction assembly comprising a plurality of traction units as claimed in claim 1, and further comprising a like plurality of coupling units, each coupling unit being positioned to intercouple an adjacent pair of said traction units, and at least one of said coupling units including a tension-adjusting arrangement.

5. A traction assembly as claimed in claim 4 in which said tension adjusting arrangement includes a turnbuckle.

6. A traction assembly as claimed in claim 4 in which at least one of the coupling units between adjacent traction units includes a plurality of chain links, a first pin connector coupling one end link to the end portion of the rocker arm in one traction unit, and a second pin connector coupling the other end link to the end portion of the rocker arm in the adjacent traction unit.

7. A traction assembly as claimed in claim 4 in which at least one coupling unit includes a T-bolt at one extremity thereof for receipt in a corresponding portion of the rocker arm end portion of the traction unit.

8. For use with a dual tire wheel arrangement in which a spacer unit defining an aperture in a central portion is positioned between the rims of the wheels in the dual tire arrangement, a traction unit as claimed in claim 1, in which said means for affixing the traction plates to the rocker arm includes first and second eyebolts, with the eye of each eyebolt on that side of the rocker arm nearer the spacer, an anchor plate defining an aperture corresponding to the aperture in said spacer unit, positioned below said spacer unit with the extremities of said anchor plate extending outwardly beyond the spacer unit to a location under the outer portions of each rim of the dual tire wheel arrangement, a third eyebolt having the eye portion extending above the spacer unit, and having the shank portion extending through the aperture in the spacer unit and through the corresponding aperture in the anchor plate, fastening means for retaining the lower portion of said third eyebolt shank below the spacer unit, and a pair of chains, one chain extending from the eye in the third eyebolt to the eye portion of the first eyebolt, and the second chain extending from the eye in the third eyebolt to the eye portion of the second eyebolt, thus securing the traction unit to the dual tire wheel arrangement.

9. A traction assembly as claimed in claim 8, and in which the fastening means for retaining the shank of the third eyebolt beneath the spacer unit comprises a spring positioned axially along said shank, and a nut in threaded engagement with said shank to retain the spring and thus accommodate the changes in distance between the third eyebolt and the outer tread portion of the tire when the tire contacts the pavement and thereafter rolls out of contact with the pavement.

10. A traction assembly as claimed in claim 9 and further comprising pin means extending through the shank of said additional eyebolt to prevent inadvertent removal of said nut.

11. A traction assembly as claimed in claim 8 in which a shackle connector is utilized between each end link of the chains and the first and second eyebolts.

12. A traction unit as claimed in claim 1 in which the traction plate wing portions each define a series of corrugations, providing a firm cushioning of the traction plates into the tread rubber areas, and enhancing the traction between the road surface and the traction plates.